United States Patent [19]

Bushman et al.

[11] Patent Number: 4,816,747
[45] Date of Patent: Mar. 28, 1989

[54] METHOD AND APPARATUS FOR ELECTRICAL SURVEYS OF SUBSURFACE STRUCTURES UTILIZING CELL-TO-CELL TECHNIQUES WITH CORRECTION TO DIRECT POTENTIAL MEASUREMENTS

[75] Inventors: James B. Bushman, Medina, Ohio; Clark P. Weldon; Stephen L. Wolfson, both of Houston, Tex.

[73] Assignee: Harco Technologies Corporation, Medina, Ohio

[21] Appl. No.: 370,141

[22] Filed: Apr. 20, 1982

Related U.S. Application Data

[63] Continuation-in-part of Ser. No. 264,200, May 15, 1981, Pat. No. 4,467,274.

[51] Int. Cl.$^4$ .................. G01V 3/08; G01V 3/15; G01R 31/02
[52] U.S. Cl. .................. 324/71.1; 324/72; 324/348
[58] Field of Search .......... 324/348, 71.1, 72, 323, 324/347, 349, 357, 360, 361, 52, 54; 364/481, 571

[56] References Cited

U.S. PATENT DOCUMENTS 3,532,980 10/1970 Tucker .................. 324/111 X
4,365,191 12/1982 Weldon et al. .................. 324/348

Primary Examiner—Reinhard J. Eisenzopf
Assistant Examiner—Walter E. Snow
Attorney, Agent, or Firm—Renner, Otto, Boisselle & Sklar

[57] ABSTRACT

Offshore or onshore electrical surveys of buried or submerged structures such as pipeline are conducted in a fixed-cell-to-moving-cell fashion either before or after one or more established pipe-to-electrolyte potentials can be obtained. The results of the fixed-cell-to-moving-cell survey are then corrected by a summation of the fixed-to-moving-cell recorded potential and the established potential at the location of the established potential to obtain a reliable electrical survey of the structure. As indicated, the fixed-cell-to-moving-cell survey may be conducted either before or after the established potential is obtained or either before or after a disposable wire survey using a direct connection to the structure.

10 Claims, 4 Drawing Sheets

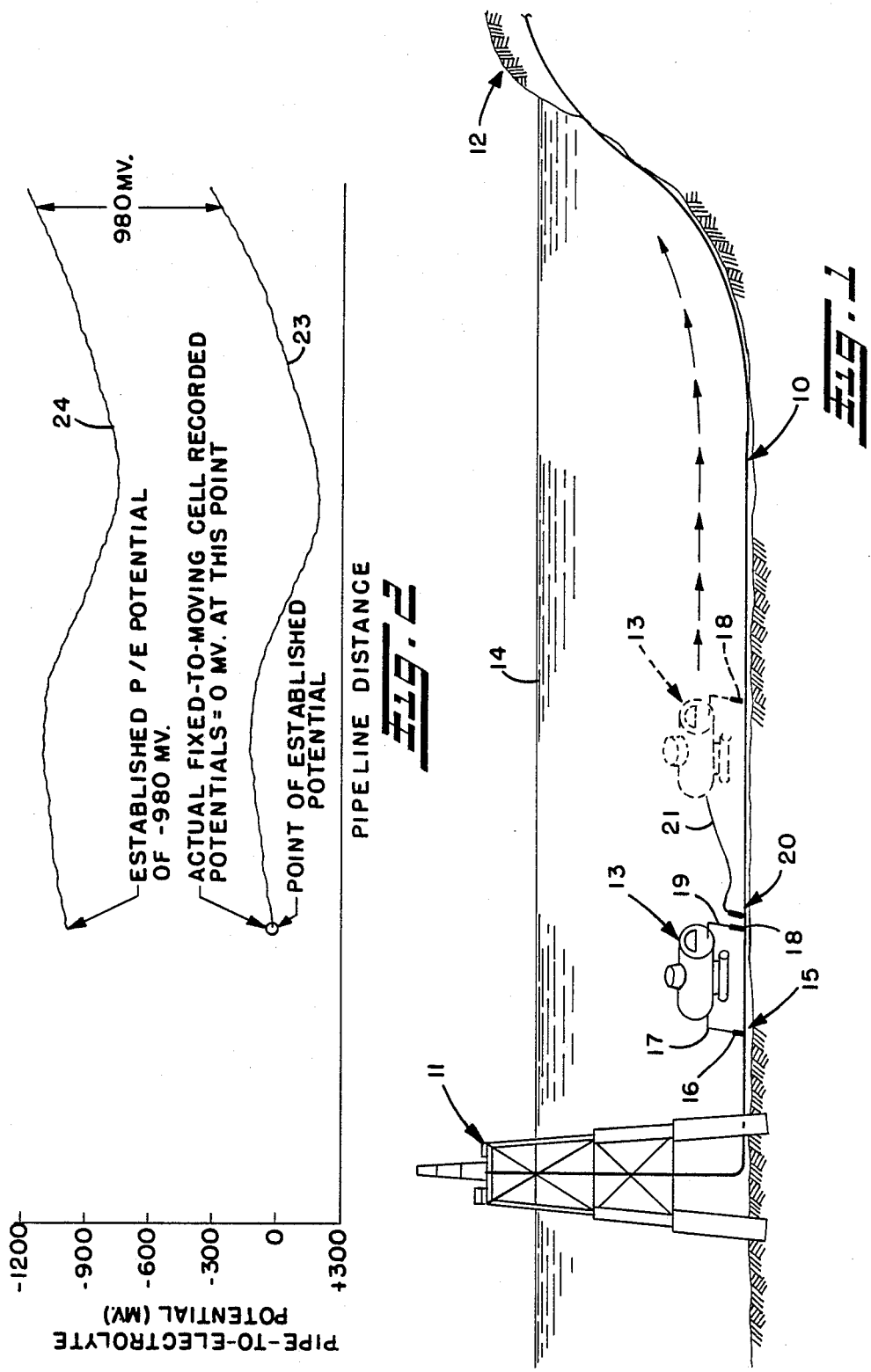

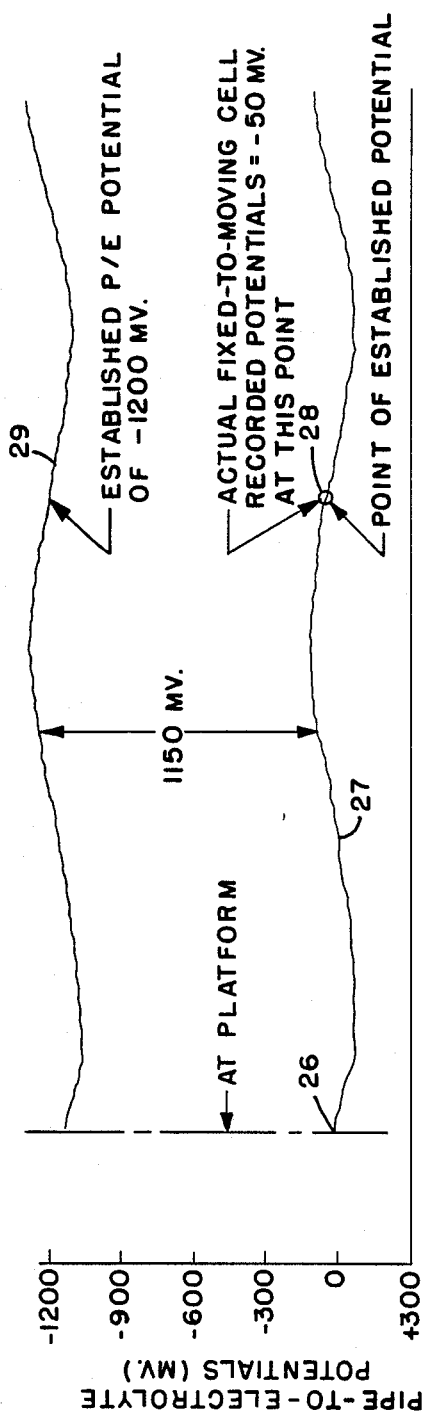
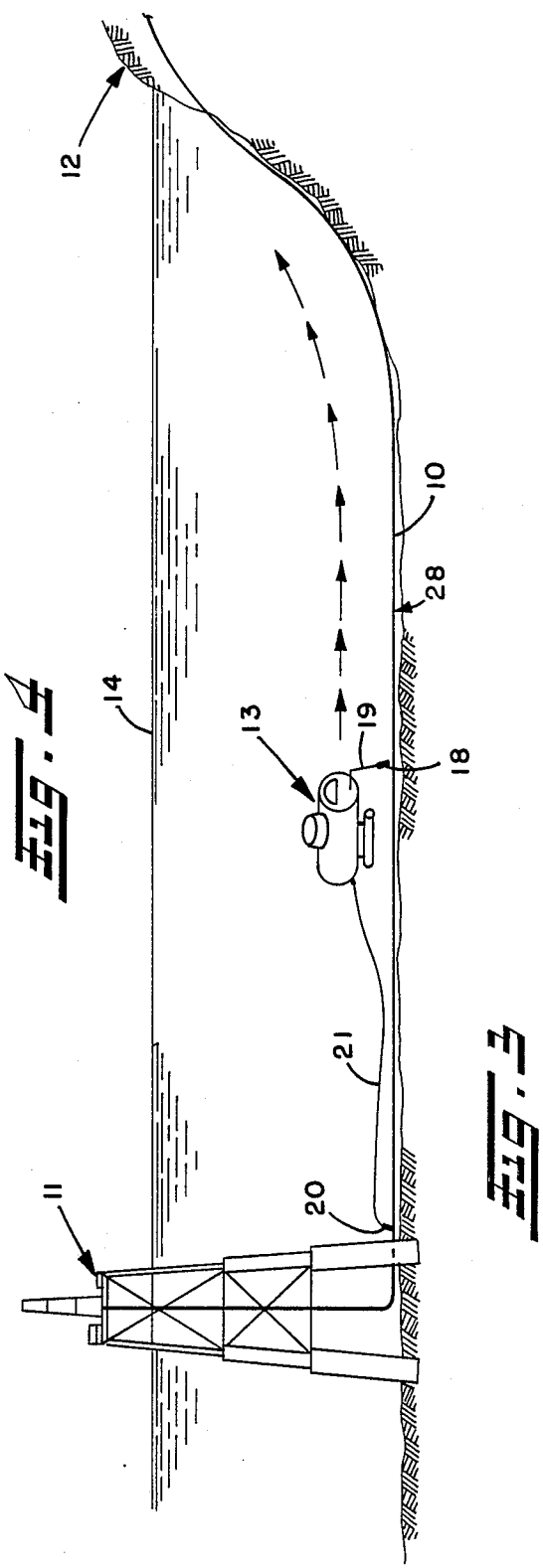

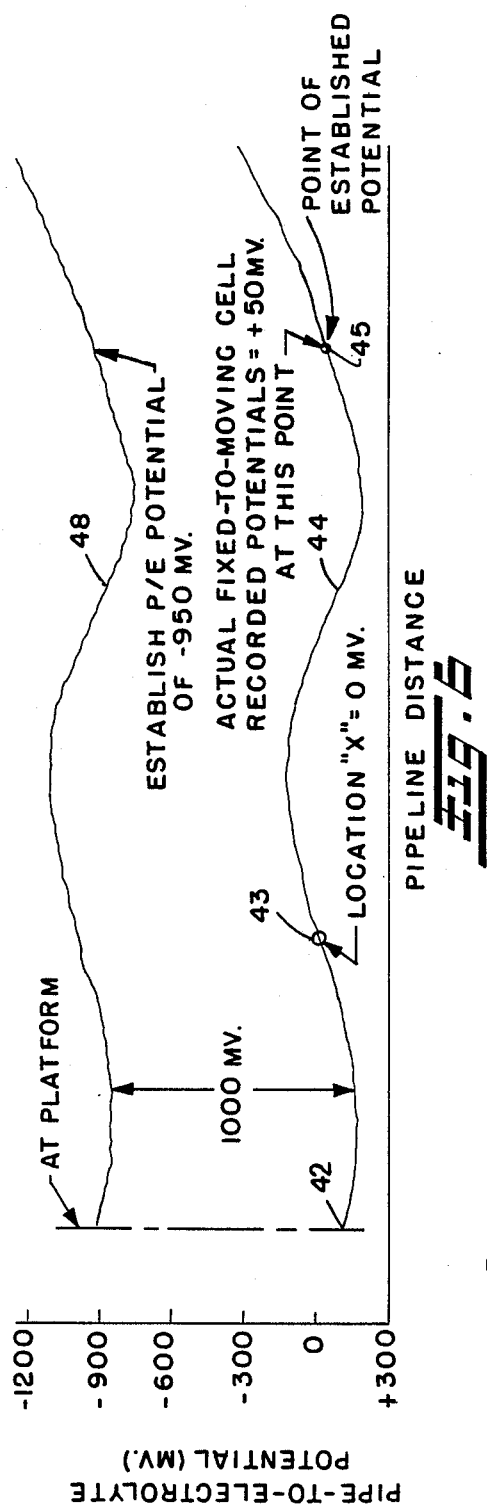
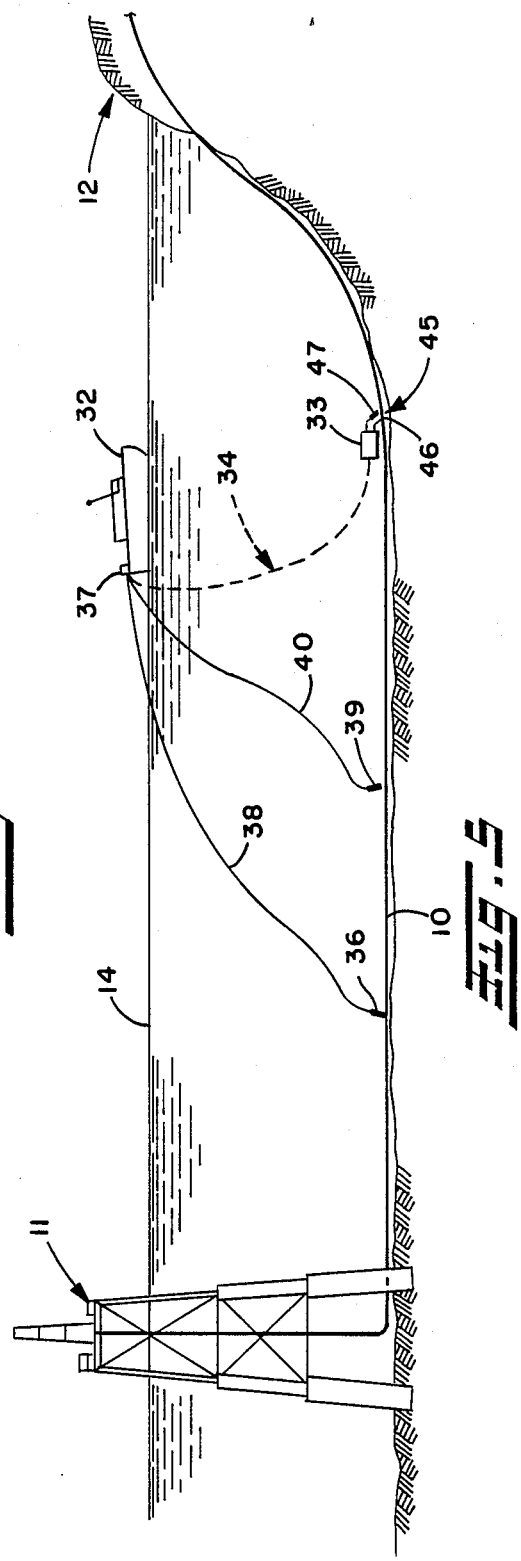

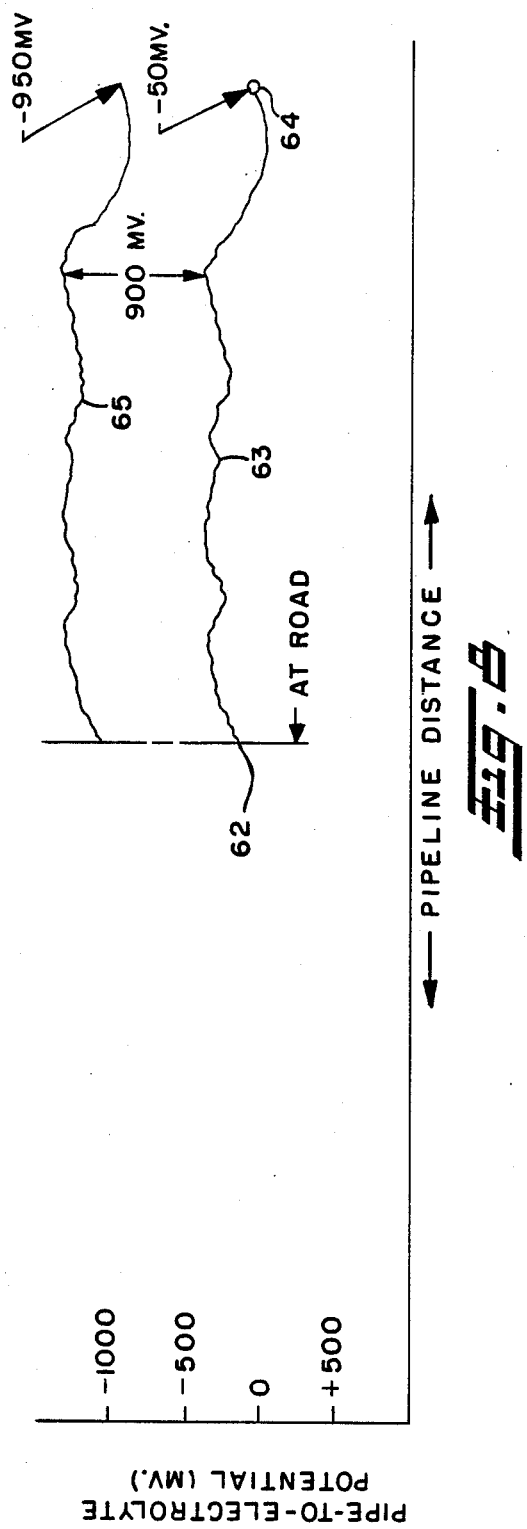
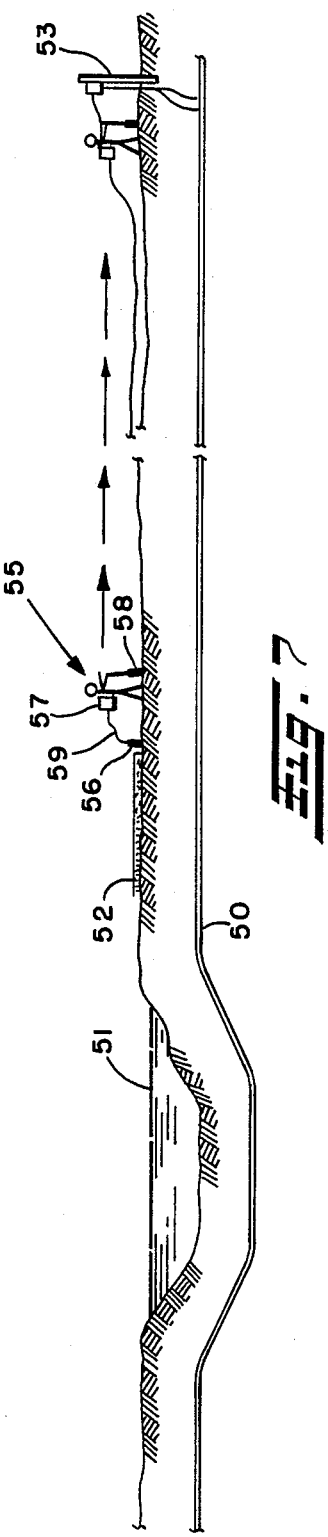

METHOD AND APPARATUS FOR ELECTRICAL SURVEYS OF SUBSURFACE STRUCTURES UTILIZING CELL-TO-CELL TECHNIQUES WITH CORRECTION TO DIRECT POTENTIAL MEASUREMENTS

RELATED APPLICATION

This application discloses and claims certain improvements in electrical surveys of underwater or underground structures shown and described in applicants' copending U.S. application Ser. No. 264,200 filed May 15, 1981, now U.S. Pat. No. 4,467,274. The disclosure of that application is incorporated herein by reference in its entirety. This application is a continuation-in-part of the application.

This invention relates generally as indicated to electrical surveys of underwater or underground structures such as pipelines.

BACKGROUND OF THE INVENTION

Such prior application discloses and claims certain improvements in electrical surveys of underground or underwater structures such as pipelines. As indicated in such prior application, surveys utilizing an established pipe-to-electrolyte potential may be continued utilizing fixed-to-moving-cell potentials if the proper corrections are made.

It has been discovered that for certain applications, such fixed-to-moving-cell surveys may be utilized either before or after (upstream or downstream) obtaining an established pipe-to-electrolyte potential, either by one or more direct electrical connections to obtain a point or points of established potential, or by a survey with a direct electrical connection. In other words, the cell-to-cell survey may be conducted either before or after a direct wire connection survey, or either before or after a single point electrical connection to obtain an established potential, with the cell-to-cell survey results being corrected by a summation of the cell-to-cell results and the established potential at the same location to obtain a reliable electrical survey of the structure.

In many situations where surveys are desired for relatively short lengths of submerged structures such as pipeline it is not possible to establish a structure-to-electrolyte potential at the desired location. Nor is it necessarily possible to maintain that established potential throughout the course of the desired survey. Thus it has been found that corrected cell-to-cell surveys conducted either before or after (following) the established structure-to-electrolyte potential may be quite useful if the results are properly correlated and corrected.

SUMMARY OF THE INVENTION

The present invention discloses a survey method of underwater or underground structures such as pipelines which includes at at least some point along the structure or pipe a measurement of the pipe-to-electrolyte potential with an electrical connection to the structure or pipe, the remainder of the survey being a fixed-to-moving-cell survey along the structure or pipe, the values obtained thereby being corrected with the pipe-to-electrolyte established potential measurement.

As indicated in applicants' prior copending application, the survey for onshore structures such as pipelines may be conducted in a cell-to-cell fashion by positioning a cell above the right of way of the pipeline and then taking periodic readings from a high impedance voltmeter also connected to a moving cell initially positioned adjacent the fixed cell, the moving cell moving along the structure or pipeline right of way. The initial reading is essentially zero and the readings thereafter fluctuate slightly on either side of zero in plus or minus millivolts. However, in order to establish the proper structure-to-electrolyte potentials, such readings have to be corrected by an established structure or pipe-to-electrolyte potential at some point. The established potential must be correlated to a reading obtained by the cell-to-cell survey.

The problem is particularly acute with regard to offshore submerged structures such as pipelines where the established potential, either as a single point or as a continuing direct connection survey, may not be readily accessible or locatable. In any event the results of the cell-to-cell survey may be corrected by simple summation once the established structure-to-electrolyte potential is obtained. In conducting the survey the cell-to-cell survey may be conducted either before or after the established potential is derived, as long as a point on the cell-to-cell survey can be correlated to the established potential.

It is accordingly a principal object of the present invention to provide a survey of underwater or underground structures such as pipeline which includes at at least some point along the structure a measurement of the pipe-to-electrolyte potential with a direct electrical connection to the structure, the remainder of the survey being a fixed-to-moving-cell survey along the structure, the values obtained thereby being corrected with the pipe-to-electrolyte measurement.

Another important object is the provision of cell-to-cell surveys in conjunction with one or more established structure-to-electrolyte potentials enabling correction to obtain convenient electrical surveys of buried or submerged structures.

Another principal object of the invention is the provision of such surveys which may be initiated without electrical contact to the structure and may be concluded with electrical contact.

A further important object is the provision of such surveys which may be initiated as a cell-to-cell survey and concluded with a single established potential measurement, or vice-versa.

Another important object is the provision of a survey which may be done cell-to-cell and readily computer corrected from an established reading to provide a meaningful graphical electrical profile of the structure being surveyed.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in a detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is an illustration of a survey conducted in accordance with the present invention of a buried structure such as a submerged pipeline from a submersible such as a submarine obtaining an initial established potential reading and continuing as a cell-to-cell survey;

FIG. 2 is a structure-to-electrolyte potential graph along the structure as seen in FIG. 1 illustrating the results obtained and the corrections;

FIG. 3 is an illustration similar to FIG. 1 but illustrating the submersible conducting initially a cell-to-cell survey to a point of established potential and thereafter correcting the results obtained;

FIG. 4 is a graph similar to FIG. 2 illustrating the results of the survey of FIG. 3;

FIG. 5 is an illustration of a survey of an underwater structure such as a pipeline utilizing a surface vessel to obtain the fixed-to-moving-cell survey and a remotely operated vehicle (ROV) to obtain the established structure-to-electrolyte potential;

FIG. 6 is a graph illustrating the results, and corrections obtained by the established potential of the survey, of FIG. 5;

FIG. 7 is a survey of an onshore buried pipeline initially obtaining a cell-to-cell survey which is thereafter corrected by the established potential; and FIG. 8 is the graph showing the results before and after the correction obtained by the established structure or pipe-to-electrolyte potential in FIG. 7.

DESCRIPTION OF THE ILLUSTRATED EMBODIMENTS

Referring first to FIG. 1 and the associated graph FIG. 2, it will be seen that there is illustrated a submerged pipeline 10 which may extend, for example, from an offshore platform 11 to some location onshore 12. Such FIG. 1 illustrates a fixed-electrode-to-moving-electrode survey accomplished by a submersible such as a submarine on either a buried or exposed subsea pipeline 10. The submarine, shown at 13, descends to the bottom of the lake, sea or ocean 14 and makes an electrical contact with the pipeline 10 at a convenient location 15 using a pointed metallic tipped device or an electrical probe, sometimes termed a stabber, as indicated at 16. The probe 16 is connected through a wire 17 to an instrumentation package onboard the submarine, which includes a high impedance voltmeter. Reference may be had to Rog et al U.S. Pat. No. 4,322,805, issued Mar. 30, 1982, for a more detailed description of what the instrumentation package may contain. A reference electrode 18 which may be manipulated by the submarine and which is also connected to the instrumentation package through wire 19 is positioned adjacent to the pipeline 10 to establish a pipe-to-electrolyte potential between the existing pipeline and the reference electrode 18 at the point illustrated which on the graph of FIG. 2 becomes the point of established potential.

The submarine then deploys a fixed disposable reference electrode seen at 20 at the same reference position or point of established potential and then proceeds down the pipeline maintaining contact to the fixed electrode 20 through an economically disposable wire 21, also connected to the instrumentation package which may be played out from the submarine as the submarine moves along the pipeline. In this manner the submarine measures the voltage differences either continuously or at closely spaced intervals between the deployed fixed electrode 20 and the moving electrode 18, also connected to the instrumentation package.

Referring now to the graph of FIG. 2 there is illustrated the pipe-to-electrolyte potential expressed in millivolts plotted along the pipeline distance. As indicated in FIG. 2, the initially measured pipe-to-electrolyte potential is, for example, −980 millivolts at the point of established potential. The fixed-to-moving reference electrode at this starting point, when the cells 18 and 20 are adjacent each other, has a voltage difference of zero millivolts. As the submarine travels down the pipeline, the variations in voltage measured between the moving cell 18 and the fixed cell 20 are regularly or continuously measured. As expected, the actual fixed-to-moving-cell recorded potentials commence at the zero millivolt level and fluctuate slightly above and below the zero value producing the curve shown generally at 23. At any given or X distance down the pipe, the potential measurement between the moving cell and fixed cell may simply be upgraded by the originally established potential at the point of established potential by the direct wire contact utilizing the probe 16. Thus, if at a given distance, a potential measurement between the moving cell and the fixed cell is −50 millivolts, the pipe-to-electrolyte potential that would exist at this point would be −930 millivolts. In other words, all of the moving-reference-electrode-to-fixed-reference-electrode measurements may be upgraded by the originally established pipe-to-electrolyte potential of (−980) millivolts to produce the pipe-to-electrolyte potential profile seen at 24 in FIG. 2. Such a profile has been found to be quite reliable where continuous direct wire contact surveys may not be practical.

Referring now to FIGS. 3 and 4, there is illustrated essentially the same type of survey with the exception that the submarine 13 may be prevented from establishing the initial pipe-to-electrolyte potential. For example, the pipe may be buried adjacent the platform or may be too well coated to make the metallic contact to the pipe necessary initially to establish a pipe-to-electrolyte potential. The survey nevertheless may begin at a point adjacent the platform simply by dropping a fixed disposable or recoverable cell 20 at the noted point adjacent the platform and merely commencing to record the moving-to-fixed reference electrode potentials as the submarine moves along the pipeline. The wire 21 is preferably of the economically disposable type which may be played out behind the submarine with both cells 18 and 20 connected through the instrumentation package which includes a high impedance voltmeter.

The fixed-to-moving-cell recorded potential may commence at the initial location shown at 26 at the noted zero value obtained when the two cells are adjacent each other and continuous or periodic readings obtain the values 27 as the submarine moves along the pipeline. The survey plotting the values 27 in a cell-to-cell fashion continues along the pipeline to some given or X distance down the pipeline such as indicated at 28 where the submarine can actually measure the pipe-to-electrolyte potential. Such measurement may be obtained in essentially the same manner as in FIG. 1 utilizing a metallic probe. In this example, as seen by the graph of FIG. 4, the pipe-to-electrolyte potential measurement at the distance X down the pipeline was found to be (−1200) millivolts. At this same point or location X it was observed that the fixed-to-moving-cell potential was −50 millivolts. Thus all other cell-to-cell potentials may be corrected by −1150 millivolts (1200 minus 50). It should be noted that the survey may continue in the cell-to-cell fashion beyond the location 28 which is then simply a repeat of the survey of FIG. 1 after the established potential is obtained. As indicated from FIG. 4, the corrected readings utilizing the factor of 1150 millivolts may be shown by the plot 29 which provides a reliable pipe-to-electrolyte potential for the course of the survey.

Referring now to FIGS. 5 and 6, there is illustrated a survey which may be made by a surface vessel 32 in association with a Remote Operated Vehicle 33 (hereinafter referred to as an ROV), which may be connected to the vessel by an umbilical cord 34. The ROV 33 in this embodiment would normally only be used to determine an established pipe-to-electrolyte potential at one or more convenient locations along the pipeline. The fixed-cell-to-moving-cell survey may be conducted utilizing a fixed cell 36 which may or may not be economically disposable connected to the instrumentation package 37 on the vessel 32 through economically disposable wire 38 played out from the vessel. The moving cell 39 is connected through wire 40 also to the instrumentation package 37. The reference cell 39 which is towed from the vessel may be positioned adjacent the pipe utilizing a convenient sail or fish. Once the fixed cell 36 is in position the survey may commence near the platform 11 as indicated by the position 42 in FIG. 6. As the towed reference cell 39 passes the fixed cell 36 the value at that location will be zero as indicated at 43. The survey continues along the pipeline establishing the fixed-to-moving-cell recorded potential seen by the curve 44. The survey continues until it arrives at a position along the pipeline where the ROV 33 may be launched to measure an established pipe-to-electrolyte potential. This may be at the point 45. The ROV may utilize a probe 46 and cell 47 to obtain such established potential. As an example, the established potential may be −950 millivolts at the location 45 where the moving-reference-electrode-potential measured with respect to the fixed-reference-electrode is determined to be +50 millivolts. Thus by addition all of the values of the profile 44 may be corrected by a factor of 1000 millivolts. The corrected profile 48 seen in FIG. 6 provides a reliable established pipe-to-electrolyte potential for the course of the survey.

It will be appreciated that instead of using an ROV to establish a correct potential at any single or multiplicity of points along the survey, a diver, swimmer, or permanently installed measuring unit which may transmit the pipe-to-electrolyte potential to the surface vessel 32 may be employed.

Referring now to FIG. 7 there is illustrated a survey generally similar to that shown in FIGS. 3 and 5, but conducted on buried onshore pipeline 50. As indicated, the pipeline 50 may extend beneath a river or stream 51, a road 52 and extend beyond beneath its right of way. Test station 53 is provided which may be some considerable distance such as several miles or kilometers from the road 52. To conduct a survey from the road to the test station where the pipe-to-electrolyte potential may be established, the surveyor, shown generally at 55 places a fixed cell 56 at the location indicated adjacent the road. The surveyor 55 may be equipped as in Rog et al U.S. Pat. No. 4,322,805 and carries the instrumentation package 57 which includes the high impedance voltmeter. The surveyor 55 may also carry one or more pole mounted movable cells shown at 58, also electrically connected to the instrumentation package 57. It will be appreciated that the fixed cell is connected to the instrumentation package through a supply of economically disposable wire 59 which the surveyor plays out as he or she moves along the pipeline right of way.

As seen in FIG. 8, initially the moving cell 58 will be placed adjacent the fixed cell 56 to obtain the initial zero reading seen at 62. The surveyor continues down the right of way taking closely spaced readings generating the profile shown at 63, which, as indicated, fluctuates above and below zero. When the surveyor reaches the test station or location where the established potential may be obtained, the reading is seen to be minus 50 millivolts, for example. Since the test station represents a convenient direct electrical connection to the buried structure or pipeline 50, the established pipe-to-electrolyte potential may readily be established at the location 64 and is found to be, for example, minus 950 millivolts. By subtraction, the correction factor of minus 900 millivolts is readily obtained which permits the profile 65 readily to be generated by computer or otherwise. Profile 65 provides a highly reliable pipe-to-electrolyte profile of the pipeline survey. The survey may continue from test station 53 either as a direct wire connection or again as a fixed-to-moving, or cell-to-cell survey. In any event, it will be seen that applicant's fixed-to-moving-cell survey is applicable both onshore and offshore.

It should be noted that for offshore applications a hard wire connection as indicated in applicants' prior copending application at either the platform or at shore may still be employed. A fixed-cell-to-moving-cell survey may be made as long as one or more pipe-to-electrolyte potentials may be measured along the pipeline length to be surveyed. It should also be noted that the established pipe-to-electrolyte potential may be obtained either before the survey, after the survey, or at any time during the survey.

Although the invention has been shown and described with respect to the preferred embodiments, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A method of conducting a structure-to-electrolyte survey of a buried structure such as a pipeline comprising the steps of positioning a fixed cell adjacent the structure, electrically connecting such fixed cell to a moving cell through a voltmeter, moving the moving cell along the structure to obtain cell-to-cell readings, and, at a location where an established electrolyte-to-structure potential can be obtained, obtaining such potential, and then correcting the cell-to-cell readings obtained to obtain an electrical survey of the buried structure.

2. A method as set forth in claim 1 wherein the fixed cell is connected to the voltmeter by a supply of economically disposable wire.

3. A method as set forth in claim 2 wherein such fixed-to-moving-cell survey is continued beyond the location of the established electrolyte-to-structure potential.

4. A method as set forth in claim 2 wherein the buried structure is a submerged pipeline, and the cell-to-cell readings are obtained from a submarine.

5. A method as set forth in claim 4 wherein the established electrolyte-to-structure potential is also obtained from the submarine.

6. A method as set forth in claim 5 wherein such established potential is obtained by a metallic probe of the structure.

7. A method as set forth in claim 2 wherein the buried structure is a submerged pipeline, and the cell-to-cell readings are obtained from a surface vessel.

8. A method as set forth in claim 7 wherein the established electrolyte-to-structure potential is obtained from a remote operated vehicle (ROV), launched from such vessel.

9. A method as set forth in claim 8 wherein such established potential is obtained by a metallic probe of the structure.

10. A method as set forth in claim 2 wherein the fixed cell is also economically disposable.

* * * * *